Feb. 14, 1967  R. D. McCLAIN  3,304,474
POWER CAPACITOR DEVICE HAVING VOLTAGE STRESS GRADING PLANE
Filed April 9, 1965  3 Sheets-Sheet 1

WITNESSES:
John L. Chopp
James F. Young

INVENTOR
Robert D. McClain
BY E. F. Possessky
ATTORNEY

Feb. 14, 1967  R. D. McCLAIN  3,304,474
POWER CAPACITOR DEVICE HAVING VOLTAGE STRESS GRADING PLANE
Filed April 9, 1965  3 Sheets-Sheet 2
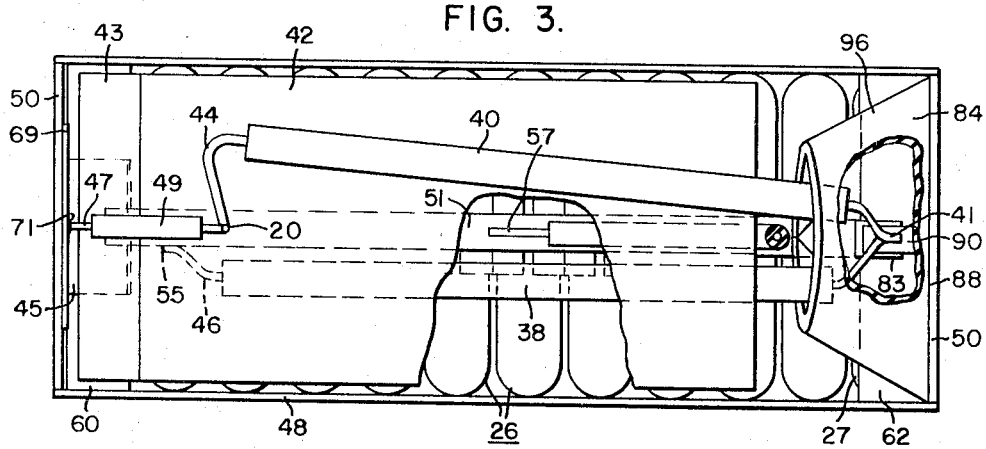
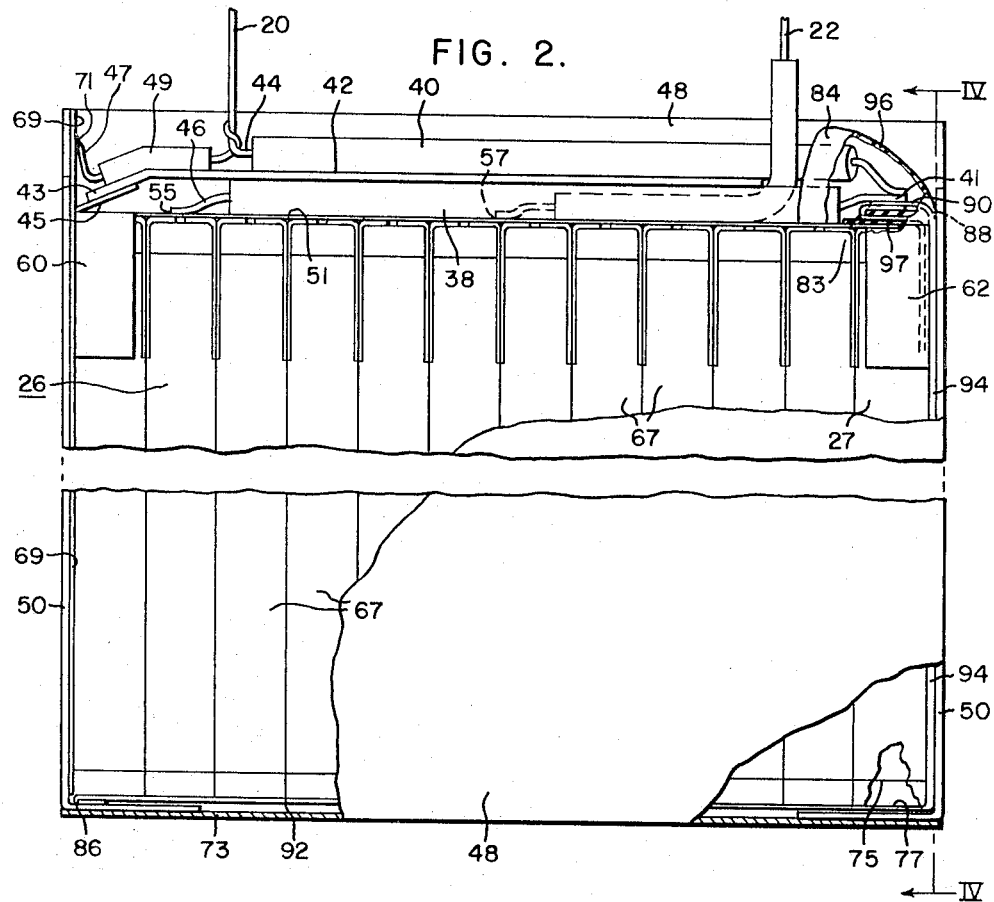

Feb. 14, 1967    R. D. McCLAIN    3,304,474
POWER CAPACITOR DEVICE HAVING VOLTAGE STRESS GRADING PLANE
Filed April 9, 1965    3 Sheets-Sheet 3
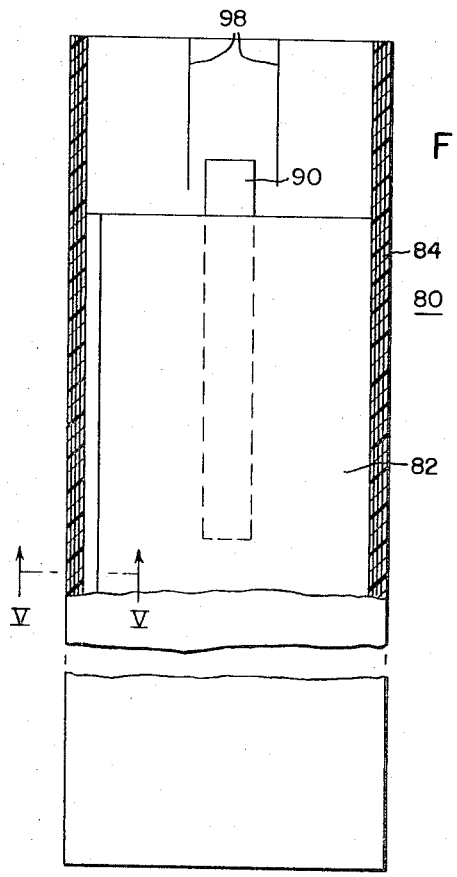
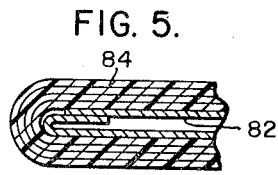
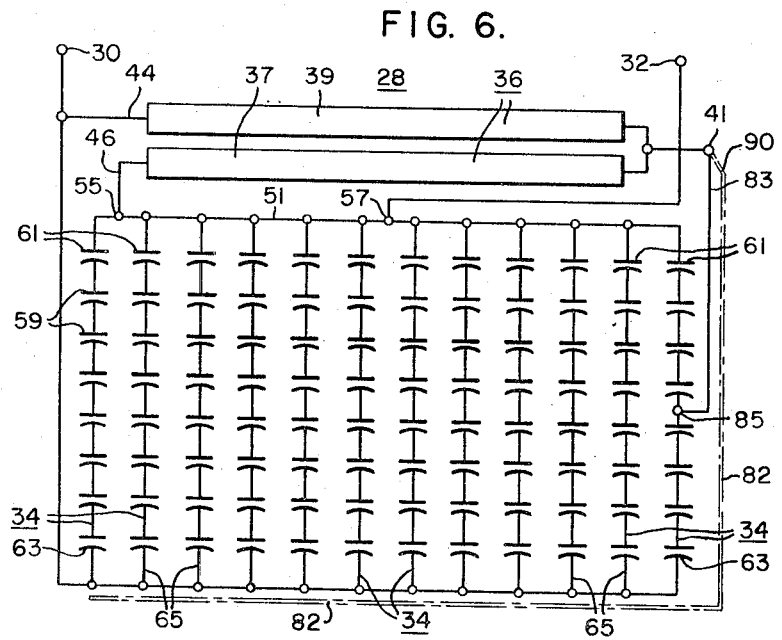

United States Patent Office 3,304,474
Patented Feb. 14, 1967

3,304,474
POWER CAPACITOR DEVICE HAVING VOLTAGE STRESS GRADING PLANE
Robert D. McClain, Bloomington, Ind., assignor to Westinghouse Electric Corporation, Pittsburgh, Pa., a corporation of Pennsylvania
Filed Apr. 9, 1965, Ser. No. 447,111
19 Claims. (Cl. 317—256)

The present invention relates to power capacitor devices, and more particularly to step-wound or other power capacitor devices in which there is a need to limit voltage stress from the section foil material to the edge of the interleaving insulative material.

In power capacitor devices, D.C. voltage up to six or seven times the rated capacitor voltage is normally applied across the section foils to test the section insulation. In the test, a high D.C. voltage thus also exists from the high voltage section foil to the capacitor casing. Very high voltages can also be applied from the high voltage section foil to the capacitor casing during normal use of the capacitor. For example, asymmetrical line voltage due to a restriking circuit breaker can build up high foil voltage in steps, or transient lightning or switching surges can result in high momentary foil voltage.

In unextended foil section designs, a part of the voltage stress is applied between the unextended bottom or top edge of the high voltage foil and the adjacent outwardly disposed edge of the insulative section interleaving, and it will therefore be referred to hereinafter as "interedge voltage stress." The section interedge voltage stress magnitude depends on the spacing of the foil and interleaving edges of any given level of voltage application, and normally the foil edge is disposed inwardly of the interleaving edge by about one-half inch so as to withstand a reasonably high level of section interedge voltage while economizing in material usage and in total capacitor height. The spacing between the edges can be less and section interedge voltage stress is accordingly relative raised when voltage is applied to the foils.

In the more common power capacitor devices, section interedge voltage stress is normally not a problem at the top or at the bottom of the sections since the section subassembly is substantially surrounded by insulation and a substantial share of the foil-casing voltage stress is applied across the subassembly insulation with the balance applied as tolerable section interedge voltage stress in the individual sections. However, section interedge voltage stress can nonetheless be a problem in extra high voltage power capacitor devices having relatively thin subassembly insulation since the division of the total voltage stress can result in an intolerable section interedge voltage stress level particularly at the bottom of the section subassembly where the section interleaving edges are much closer to the casing than they are at the top. Further, even in lower voltage rating capacitor devices section interedge voltage stress can be a problem if it is desired to use relatively thin subassembly insulation for improvement in heat transfer characteristics.

Step-wound capacitor devices can be arranged such that the low voltage foil is electrically common with the casing and the subassembly insulation is entirely eliminated to achieve markedly improved heat transfer characteristics. A fuller disclosure of such structure is presented in a copending application entitled Power Capacitor Device Having Improved Temperature Operating Characteristics, Serial No. 407,316, filed by the present inventor on October 29, 1964, now Patent No. 3,254,281, issued May 31, 1966, and assigned to the present assignee. With the elimination of subassembly insulation in the step-wound capacitor devices, the problem of section interedge voltage stress can be particularly acute especially at the bottom of the section subassembly in devices having an overall voltage rating of 8000 volts or more.

The need for limiting section interedge voltage stress thus exists in various degrees in power capacitor devices of various types and various ratings. In accordance with the principles of the present invention, an insulated voltage stress grading plane is electrically connected and physically disposed within a capacitor device so as to divide the total voltage stress into one segment between the high voltage section foils and the grading plane and another segment between the grading plane and the capacitor casing. The potential of the grading plane is established such that interedge section voltage stress is effectively limited to tolerable values under test and most line or field operating conditions.

It is therefore an object of the invention to provide a novel capacitor device capable of withstanding higher section to casing voltages.

Another object of the invention is to provide a novel capacitor device capable of withstanding higher section to casing voltages and having reduced section foil and interleaving edge spacing to provide reduced capacitor height.

An additional object of the invention is to provide a novel power capacitor device capable of withstanding higher section to casing voltages and having improved heat transfer through reduction in section subassembly insulation thickness where such insulation is employed.

A further object of the invention is to provide a novel step-wound power capacitor device which has no section subassembly insulation and which is capable of withstanding higher section to casing voltages.

These and other objects of the invention will become more apparent upon consideration of the following detailed description along with the attached drawings, in which:

FIGURE 2 shows a side elevational view of a section subassembly employed in the structure shown in FIGURE 1;

FIGURE 3 shows a top view of the structure shown in FIG. 2 with portions thereof removed in order to illustrate certain structural details;

FIGURE 4 shows a longitudinal section of a grading plane assembly employed in the section subassembly;

FIGURE 5 shows a cross section of the grading plane assembly taken along the reference line V—V of FIG. 4; and FIGURE 6 shows a schematic circuit diagram representing the electrical circuitry in the power capacitor device.

Figure 1:
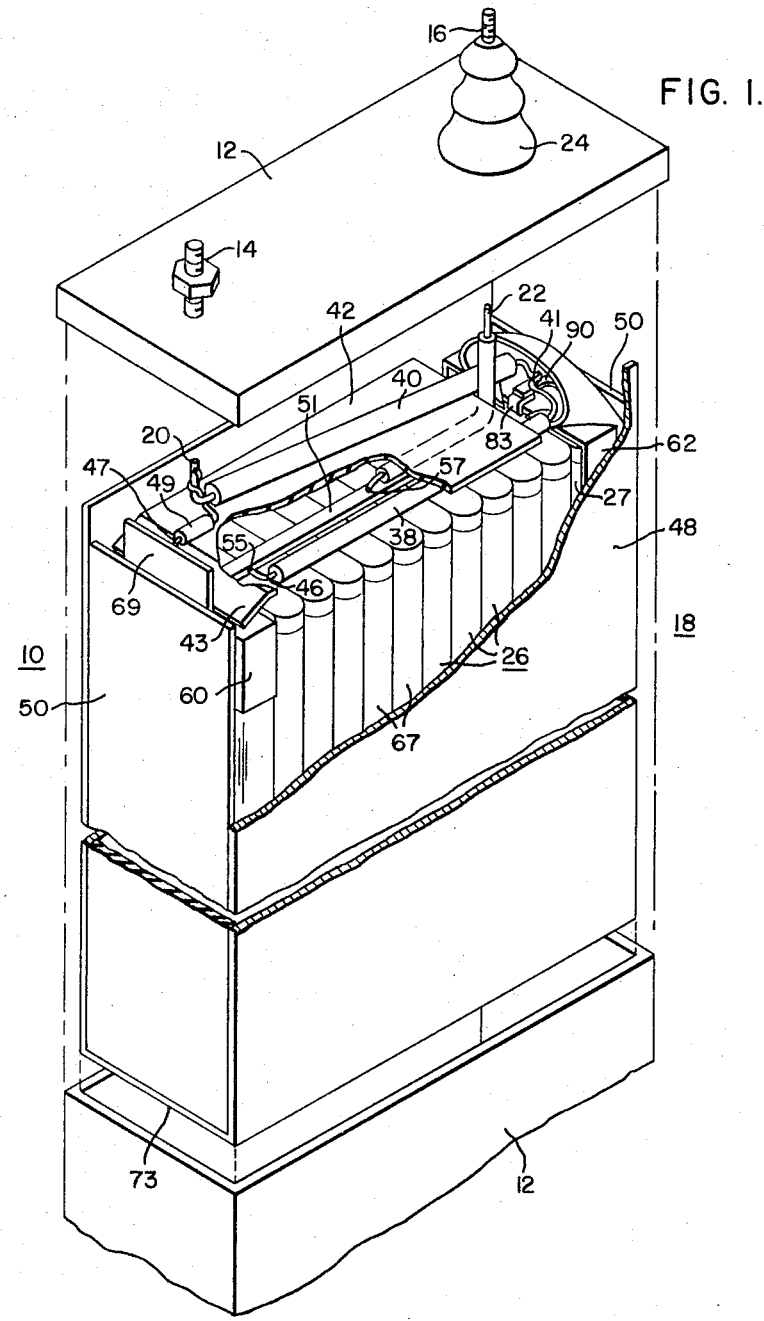
FIGURE 1 shows an exploded perspective view of a capacitor device constructed in accordance with the principles of the invention and having portions thereof removed for the purpose of clarifying the structure.

More specifically there is shown in FIGURE 1 a single phase power capacitor device 10 constructed in accordance with the principles of the invention and having a weatherproof metallic casing 12 with external terminals 14 and 16 to which an internally located capacitor section subassembly 18 is connected by a connector 20 and an insulated connector 22. In this instance, the terminal 16 is provided with a bushing 24 for operation at an elevated potential and the terminal 14 is electrically common or at ground potential with the casing 12. Plural or three-phase devices can also be constructed in accordance with the invention.

The section subassembly 18 comprises at least one but preferably a plurality of capacitor sections 26 interconnected to form a single phase capacitor device circuit 28 (FIG. 6) between terminals 30 and 32 which correspond respectively to the device terminals 14 and 16. In the schematic of FIG. 6, the respective capacitor section circuits within the overall circuit 28 are designated by the reference character 34.

A resistive shunt circuit 36 is connected in the device circuit 28 between the terminals 30 and 32 for the usual purpose of discharging the capacitor to a safe voltage level after disconnection from service. In this instance, the resistive circuit 36 is divided into two parts, namely high voltage discharge resistance means 37 and intermediate voltage discharge resistance means 39 interconnected at a junction 41.

In the device of FIG. 1, the resistance means 37 is disposed in an insulative tube 38 which is physically disposed on the top surface of the capacitor sections 26, and the resistance means 39 is disposed in an insulative tube 40 which is supported above the insulative resistor tube 38 by a generally flat insulative sheet-like insert 42. The insulative sheet 42 extends along most of the length of the top surface of the capacitor sections 26 and is provided with an end flap-like member 43 which cooperates with an end insulation piece 45 to support a grounding lead 47 above the capacitor sections 26 with ample dielectric barrier from the high voltage connections immediately therebelow. The lead 47 is encased in an insulative tube 49 and connected to the ground terminal connector 20.

High voltage tabs are brought out from the high voltage foils in each of the capacitor sections 26 and commonly interconnected as indicated by the reference character 51 (FIGS. 3 and 6) thereby to form a high voltage parallel connection common to the section capacitance circuits 34. The resistance means 39 is connected to the connector 20 through a lead 44 and the resistance means 37 is connected to the connector 22 through a lead 46 and the tab connection 51. The lead 46 and the tab connection 51 form a circuit junction indicated by the reference character 55 in FIGS. 3 and 6, and the high voltage terminal connector 22 similarly forms a circuit junction with the tab connection 51 as indicated by the reference character 57 in FIGS. 3 and 6.

To facilitate insertion of the section subassembly 18 into the casing 12 during manufacture, a metallic (for example steel) U-shaped channel member 48 is disposed about the major sides and the bottom of the subassembly 18. Further, a pair of conductive or insulative L-shaped panel members 50 can be disposed adjacent each end of the sub-assembly 18 for protecting the end sections. The channel member 48 also serves as an intermediate agent for heat transfer from the sections 26 to the casing 12 and the ambient. Promotion of heat transfer can be achieved through the employment of suitable interconnecting resilient means (not shown) between the channel member 48 and the casing 12 as is more fully disclosed in the aforementioned copending application.

Generally, each section 26 is formed by a convolute winding of capacitor plate foil material such as aluminum foil and insulative interleaving sheet material. The foil material is preferably wound in an intermittent fashion to form a plurality of series connected capacitor voltage step plate foils as indicated by the reference character 59 in FIG. 6 and preferably as disclosed in the aforementioned copending application. Thus, the tabs for the tab connecting means 51 (FIG. 3) are disposed in contact with high voltage foils 61 in the various sections 26 during the winding process.

The lowest voltage foil in each section 26 is indicated by a reference character 63 and it is preferably brought to ground potential by connecting means 65 (FIG. 6). For this purpose, the capacitor foil 63 in each section 26 is brought to the section exterior and wound with the desired number of turns to form outer foil connecting means 67 (FIGS. 1 and 2) which corresponds to the connecting means 65. When the subassembled sections 26 are held in compression within the casing 12, the end foils 63 of all the sections 26 are thus commonly connected together through the outer foil means 67.

A pressure plate 69 is disposed between the end section 26 and the protective panel 50 at one end of the subassembly 18, and the grounding lead 47 is secured to the plate 69 as indicated by the reference character 71 (FIG. 2) so as to establish a positive ground connection between the section outer foil turns 67 and the casing or ground lead 20. End insulation pieces 60 and 62 provide an insulation barrier between the high voltage connection 51 and the low voltage portions 47, 67 and 69 at one subassembly end and the low voltage portions 67 at the other subassembly end.

Since the section end foil means 67 are disposed at casing potential, there is no need for insulation between the subassembled sections 26 and the channel member 48 or the casing 12. Heat transfer advantages are thus realized as described in the aforementioned copending application.

When the number of series connected voltage step capacitor foils 59 is increased to support a higher overall voltage rating for the capacitor device 10, voltage stress between the high voltage capacitor foil 61 and the bight portion 73 of the channel member 48 (or an adjacent unshown casing portion if the channel member 48 is not employed) becomes increasingly severe under test and other conditions. The same problem may be encountered with capacitor section subassemblies of conventional single voltage step per wound section design in extra high voltage power capacitor devices or in power capacitor devices where the side and bottom insulation is made relatively thin for improved heat transfer from the capacitor sections. Likewise, the problem may be intensified where extension of the interleaving dielectric is shortened for reasons of economy and size reduction.

An edge 75 (FIG. 2) of the high voltage capacitor foil 61 in each section 26 is spaced from an outer edge 77 of the adjacent interleaving at an inner part of the section spiral. The spacing between the foil and insulation edges 75 and 77 is preferably kept as small as possible in order to conserve overall capacitor height and to conserve usage of the winding materials.

Normally, the interedge spacing is about one-half inch in power capacitor devices (although it can be more or less), and with such spacing voltage stress between the edges 75 and 77 can become so great as to produce arcing and breakdown (particularly at the bottom of the section subassembly) under the test and usage conditions previously described. For example, for a capacitor device 10 rated at 13,280 volts, the D.C. voltage applied to test the insulation strength of the dielectric material between the capacitor foils 59 is approximately 83,000 volts. Substantially all of the total D.C. test voltage of 83,000 volts is thus applied between the high voltage foil edge 75 and the channel member 48 or the casing 12.

To limit the section interedge voltage stress to tolerable values, an electric field grading plane assembly 80 is employed in the capacitor subassembly 18. The grading plane assembly 80 includes an equipotential conductor 82 (FIGS. 4 and 6) which is preferably connected through a grading plane tab 90 and a foil tab 83 to a mid-voltage level section foil 85 so as to establish the conductor equipotential at the mid-voltage level. The capacitor foil tab 83 and the grading assembly tab 90 are also commonly connected to the resistor junction 41 which is also at the mid-voltage level.

The grading plane conductor 82 is preferably formed from foil material such as aluminum foil. To facilitate manufacture, a relatively long piece of foil is wrapped laterally about a winding mandrel for approximately one complete turn. The winding of the grading plane assembly 80 is completed by disposing the tab 90 against the conductor 82 and wrapping a plurality of turns of insulation 84 about the foil turn.

The assembly is then removed from the mandrel and flattened such that the conductor 82 and the insulation 84 are provided with generally O-shaped cross sections (FIG. 5). The insulation 84 extends beyond each end of the grading plane conductor 82 and can be reversely folded as indicated at 86 (FIG. 2), and bent over as shown at 88.

The grading plane assembly 80 is bent to form a horizontal leg 92, which extends along the bottom of the section subassembly 18 between the bottom surface of the capacitor sections 26 and the bight portion 73 of the channel member 48, and an upstanding leg 94 which is disposed between the L-shaped protective panel 50 and the adjacent end capacitor section 26 or 27 at the end of the subassembly opposite from the pressure plate 69. The surface coverage of the conductor 82 is sufficient to "grade" the electric field applied between the various section high voltage foil edges 75 and the channel member 48 or the casing 12. By "grading an electric field" it is meant to refer to an equipotential plane which cuts an electric field such that substantially separate fields are provided on each side of the plane with negligibly little bypass fringing of the field lines about the edges of the plane. To achieve proper field grading, the outer perimeter of the flattened horizontal leg portion of the metal foil conductor 82 preferably lies horizontally outwardly of a reference rectangular solid plane extending through the subassembly 18 and defining the outer limits of the convolutely wound mid-voltage and higher voltage foils 85 and 59. In this case, both the overall width and the overall length of the grading plane assembly leg 92 are sufficient to cover substantially the entire bottom surface of the subassembled sections 26.

The upper end of the upstanding grading plane assembly leg 94 is bent over as indicated by the reference characters 88 and 96 above the top surface of the capacitor sections 26, and the downward facing side of the grading plane insulation 84 is slit as indicated by the reference character 98 so that the grading plane tab 90 can be soldered or otherwise attached to the capacitor foil tab 83 (which for assembly convenience is incorporated as a part of the end section 27 adjacent to the vertical assembly leg 94) and the resistor junction 41. An insulative flag-like piece 97 extends upwardly from within the end section 27, and it is bent over to insulate the mid-voltage tab 83 from the high voltage tap connection 51. Since the insulation 84 is disposed about the entire conductor 82 including the portion in the vertical assembly leg 94, the end foil means 67 of the end section 27 is insulated from the conductor 82.

As previously indicated, the grading plane conductor 82 is held at a potential intermediate to (and preferably midway between) the high voltage potential at the high voltage foil 61 and the potential of the channel member 48 or the casing 12, and the electric field or voltage stress between the section foil and insulation edges 75 and 77 is accordingly limited to the potential difference between the foil 61 and the foil 85 or the junction 41. The balance of the voltage stress is applied from the grading plane conductor 82 to the channel member 48 through the grading plane insulation 84.

Since the grading plane conductor 82 is provided with an equipotential at the midvoltage level, the voltage stress distribution on each side of the grading plane conductor 82 is generally symmetrical. The fact that the grading plane conductor 82 is connected in the resistance circuit 36 and at least one section capacitance circuit 34 (with approximately ten times greater capacitance between the device terminal connectors 20 and 22 than that between the grading conductor 82 and the terminal connector 22) assures satisfactory voltage stress division on the opposite sides of the grading plane conductor 82 whether the applied voltage is steady-state as in test conditions or whether it rises as a transient with high frequency characteristics under other test or use conditions.

With the employment of the grading plane assembly 80 in a step-wound capacitor device, excessive interedge voltage stress in the capacitor sections is efficiently and effectively avoided. Since excessive voltage stress is avoided without providing additional interedge physical spacing of the foil and insulative wrapping in the capacitor sections, a saving in material and in overall height of the capacitor device is realized. In a test of a sample of the previously noted 13,280 v. D.C. capacitor device 10, the test voltage of 83,000 v. D.C. was approximately equally divided into voltages of 41,500 v. D.C. on opposite sides of the grading conductor portion in the horizontal assembly leg 92.

Further, extended utility of step-wound capacitors is provided to higher voltage ratings so that the improved heat transfer and improved section temperature operating characteristics of step-wound capacitors is made available at such higher device voltage ratings. Although the grading plane assembly 80 has been described in combination with a step-wound capacitor, it can also be advantageously employed in more conventional wound section capacitor devices where subassembly insulation is provided.

The foregoing description has been presented only to illustrate the principles of the invention. Accordingly, it is desired that the invention be not limited by the embodiments described, but rather, that it be accorded an interpretation consistent with the scope and spirit of its broad principles.

I claim as my invention:

1. A power capacitor device comprising a casing having at least one high voltage terminal disposed thereon, a capacitor section subassembly disposed in said casing, said section subassembly including a plurality of compressed sections wound from foil and insulative interleaving to form respective capacitive circuits, means connecting said section capacitive circuits in a device circuit, at least some of said sections having wound high voltage foil means, an assembled section surface formed by ends of said sections, a conductor disposed along said section surface so as to provide an equipotential plane which grades any electric field applied between said foil means and said casing, insulative means disposed about said conductor, and means for holding said conductor at a potential intermediate to the potential of said terminal and said casing.

2. A power capacitor device comprising a casing having at least one high voltage terminal disposed thereon, a capacitor section subassembly disposed in said casing, said section subassembly including a plurality of compressed sections wound from foil and insulative interleaving to form respective capacitive circuits, means connecting said section capacitive circuits in a device circuit, at least some of said sections having wound high voltage foil means, an assembled section surface formed by ends of said sections, a voltage stress grading conductor disposed over substantially all of said section surface, insulative wrapping means disposed about said conductor and against said section surface, and means for holding said conductor at a potential intermediate to the potentials of said terminal and said casing.

3. A power capacitor device comprising a casing having at least one high voltage terminal disposed on a top side thereof, a capacitor section subassembly disposed in said casing and having a plurality of elongated compressed sections wound from foil and insulative interleaving to form respective capacitive circuits, means connecting said section capacitive circuits in a device circuit, said sections extending in a direction generally perpendicular to said top casing side, top and bottom assembled section surfaces formed by opposite ends of said sections, at least some of said sections having wound high voltage foil means, a conductor disposed along said bottom section surface so as to provide an equipotential plane which grades any electric field applied between said foil means and said casing, means for insulating said conductor from said casing and said foil means, and means for holding said conductor at a potential intermediate to the potentials of said terminal and said casing.

4. A power capacitor device comprising a casing having at least one high voltage terminal disposed on a top side thereof, a capacitor section subassembly disposed in said casing and having a plurality of elongated compressed sections wound from foil and insulative interleaving to form respective capacitive circuits, means connecting said section capacitive circuits in a device circuit, said sections extending in a direction generally perpendicular to said top casing side, top and bottom assembled section surfaces formed by opposite ends of said sections, at least some of said sections having wound high voltage foil means, a conductor disposed along said bottom section surface so as to provide an equipotential plane which grades any electric field applied between said foil means and said casing, means for insulating said conductor from said casing and said foil means, a divided resistance circuit insulatively disposed between the top section surface and said top casing side, means interconnecting said resistance circuit in the device circuit, and means connecting said conductor to a potential point of said resistance circuit intermediate to the potentials of said terminal and said casing.

5. A power capacitor device comprising a casing having at least one high voltage terminal disposed on a top side thereof, a capacitor section subassembly disposed in said casing and having a plurality of elongated compressed sections wound from foil and insulative interleaving to form respective capacitive circuits, means connecting said section capacitive circuits in a device circuit, said sections extending in a direction generally perpendicular to said top casing side, top and bottom assembled section surfaces formed by opposite ends of said sections, at least some of said sections having wound high voltage foil means, a conductor having a grading leg portion disposed along said bottom section surface so as to provide an equipotential plane which grades any electric field applied between said foil means and said casing, a divided resistance circuit insulatively disposed between said top section surface and said top casing side, means interconnecting said resistance circuit in the device circuit, another leg portion of said conductor extending along an outer side surface of one of the end sections in said subassembly, insulative means disposed about said conductor leg portions, and means connecting said conductor other leg portion to a potential point of said resistance circuit intermediate to the potentials of said terminal and said casing.

6. A power capacitor device comprising a casing having at least one high voltage terminal disposed on a top side thereof, a capacitor section subassembly disposed in said casing and having a plurality of elongated compressed sections wound from foil and insulative interleaving to form respective capacitive circuits, means connecting said section capacitive circuits in a device circuit, said sections extending in a direction generally perpendicular to said top casing side, top and bottom assembled section surfaces formed by opposite ends of said sections, at least some of said sections having wound high voltage foil means, a conductor having a grading leg portion disposed along said bottom section surface so as to provide an equipotential plane which grades any electric field applied between said foil means and said casing, a divided resistance circuit insulatively disposed between said top section surface and said top casing side, means interconnecting said resistance circuit in the device circuit, another leg portion of said conductor extending along an outer side surface of one of the end sections in said subassembly, a conductive tab held in compression against said conductor other leg portion, insulative means disposed about said conductor leg portions and means connecting said tab to a potential point of said resistance circuit intermediate to the potentials of said terminal and said casing.

7. A power capacitor device comprising a casing having at least one high voltage terminal disposed on a top side thereof, a capacitor section subassembly disposed in said casing and having a plurality of elongated compressed sections voltage step-wound from foil and insulative interleaving to form respective capacitive circuits, each of said sections having outer voltage step foil means wound thereabout, means connecting said outer foil means to a common device terminal, said sections extending in a direction generally perpendicular to said top casing side, top and bottom assembled section surfaces formed by opposite end edges of the interleaving in said sections, each of said sections having high voltage foil means wound therein and having an edge disposed inwardly of said bottom section surface, means for connecting said high voltage foil means in a device circuit, a conductor disposed along said bottom surface so as to provide an equipotential plane which grades any electric field applied between said high voltage foil means and said casing, means for insulating said conductor from said casing, and means for holding said conductor at a potential intermediate to the potentials of said terminal and said casing.

8. A power capacitor device comprising a casing having at least one high voltage terminal disposed on a top side thereof, a capacitor section subassembly disposed in said casing and having a plurality of elongated compressed sections voltage step-wound from foil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having high voltage foil means wound therein and having an edge disposed inwardly of said bottom section surface, means for connecting said high voltage foil means and said outer foil means in a device circuit, a conductor disposed along said bottom surface so as to provide an equipotential plane which grades any electric field applied between said high voltage foil means and said casing, means for insulating said conductor from said casing, and means for holding said conductor at a potential intermediate to the potentials of said terminal and said casing.

9. A power capacitor device comprising a casing having at least one high voltage terminal disposed on a top side thereof, a capacitor section subassembly disposed in said casing and having a plurality of elongated compressed capacitor sections voltage step-wound from foil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having high voltage foil means wound therein and having an edge disposed inwardly of the bottom section surface, means for connecting said high voltage foil means and said outer foil means in a device circuit, a voltage stress grading conductor disposed over substantially all of said bottom section surface, insulative wrapping means disposed about said conductor and against said bottom section surface, and means for holding said conductor at a potential intermediate to the potentials of said terminal and said casing.

10. A power capacitor device comprising a casing having at least one high voltage terminal disposed on a top side thereof, a capacitor section subassembly disposed in said casing and having a plurality of elongated compressed capacitor sections voltage step-wound from foil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having high voltage foil means wound therein and having an edge disposed inwardly of said bottom section surface, means for connecting said high voltage foil means and said outer foil means in a device circuit, a conductor disposed along said bottom surface so as to provide an equipotential plane which grades any electric field applied between said high voltage foil means and said casing, means for insulating said conductor from said casing, a divided resistance circuit insulatively disposed between said top section surface and said top casing side, means interconnecting said resistance circuit in the device circuit, and means connecting said conductor to a potential point of said resistance circuit intermediate to the potentials of said terminal and said casing.

11. A power capacitor device comprising a casing having at least one high voltage terminal disposed on a top side thereof, a capacitor section subassembly disposed in said casing and having a plurality of elongated compressed capacitor sections voltage step-wound from foil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having high voltage foil means wound therein and having an edge disposed inwardly of the bottom section surface, means for connecting said high voltage foil means and said outer foil means in a device circuit, a conductor having a grading leg portion disposed along said bottom section surface so as to provide an equipotential plane which grades any electric field applied between said high voltage foil means and said casing, another leg portion of said conductor extending along another side surface of one of the end sections in said subassembly, means for insulating said conductor leg portions from said casing and said outer foil means, a divided resistance circuit insulatively disposed between said top section surface and said top casing side, means interconnecting said resistance circuit in the device circuit, and means connecting said conductor other leg portion to a potential point of said resistance circuit intermediate to the potentials of said terminal and said casing.

12. A power capacitor device comprising a casing having at least one high voltage terminal disposed on a top side thereof, a capacitor section subassembly disposed in said casing and having a plurality of elongated compressed capacitor sections voltage step-wound from coil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having intermediate voltage foil means wound therein, means for connecting said high voltage foil means and said outer foil means in a device circuit, a conductor disposed along said bottom surface so as to provide an equipotential plane which grades any electric field applied between said high voltage foil means and said casing, means for insulating said conductor from said casing, and means connecting said conductor to one of said intermediate foil means in at least one of said sections.

13. A power capacitor device as set forth in claim 12 wherein said one intermediate voltage foil means is a mid-voltage foil means.

14. A power capacitor device comprising a casing having at least one high voltage terminal disposed on a top side thereof, a capacitor section subassembly disposed in said casing and having a plurality of elongated compressed capacitor sections voltage step-wound from coil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having intermediate voltage foil means wound therein, means for connecting said high voltage foil means and said outer foil means in a device circuit, a conductor disposed along said bottom surface so as to provide an equipotential plane which grades any electric field applied between said high voltage foil means and said casing, means for insulating said conductor from said casing, a divided resistance circuit insulatively disposed between said top section surface and said top casing side, means interconnecting said resistance circuit in the device circuit, and means connecting said conductor to an intermediate potential point of said resistance circuit and to one of said intermediate foil means in at least one of said sections.

15. A power capacitor device comprising a casing having at least one high voltage terminal disposed on a top side thereof, a capacitor section subassembly disposed in said casing and having a plurality of elongated compressed capacitor sections voltage step-wound from coil and insulative interleaving to form respective capacitive circuits, each of said sections having outer voltage step foil means wound thereabout, said sections extending in a direction generally perpendicular to said top casing side, top and bottom assembled section surfaces formed by opposite end edges of the interleaving in said sections, each of said sections having mid-voltage foil means wound therein, a voltage stress grading conductor having a grading leg disposed over substantially all of said bottom section surface, insulative means disposed about said conductor and against said bottom section surface, another leg portion of said conductor extending along an outer side surface of one of the end sections and said subassembly, means for insulating said conductor other leg portion, a divided resistance circuit insulatively disposed between said top section surface and said top casing side, means interconnecting said resistance circuit in the device circuit, and means connecting said conductor other leg portion to a mid-potential point of said resistance circuit and to said mid-voltage foil means in at least one of said sections.

16. A power capacitor device as set forth in claim 8 wherein said sections are assembled within a U-shaped channel member having vertically extending legs extending vertically along opposite side surfaces of the assembled sections, insulative means are disposed about said conductor, and said conductor insulative means and said conductor are disposed between said bottom section surface and a bight portion of said U-shaped channel member.

17. A power capacitor device as set forth in claim 16 wherein said insulated conductor includes an insulated leg portion extending along an outer side surface of one of the end sections in said subassembly, a conductive pressure plate is disposed in pressure contact with the outer turn foil means on an outer side surface of the other end section in said subassembly, and means are provided for connecting said pressure plate to a common device terminal.

18. A power capacitor device as set forth in claim 15, wherein the last mentioned connecting means includes a tab in pressure contact with the mid-voltage plate foil means in the one end section.

19. A power capacitor device as set forth in claim 18 wherein the last mentioned connecting means also includes a conductor tab in pressure contact with said conductor other leg portion.

References Cited by the Examiner
UNITED STATES PATENTS

Re. 25,644    9/1964    Linderholm _____ 317—243

LEWIS H. MYERS, *Primary Examiner.*

LARAMIE E. ASKIN, *Examiner.*

E. A. GOLDBERG, *Assistant Examiner.*